United States Patent Office 3,114,695
Patented Dec. 17, 1963

3,114,695
AMORPHOUS ALUMINOSILICATE CATALYST COMPOSITIONS FOR HYDROCARBON CONVERSION REACTIONS
Jule A. Rabo, Buffalo, and Paul E. Pickert, North Tonawanda, N.Y., assignors to Union Carbide Corporation, a corporation of New York
No Drawing. Filed Dec. 30, 1959, Ser. No. 862,752
8 Claims. (Cl. 208—46)

This invention relates to new compositions of matter and more particularly to new compositions comprising supports containing thereon finely distributed active metals.

Metal-containing compositions and various methods of manufacturing these compositions have been suggested heretofore. However, these compositions have achieved limited commercial acceptance because of their restricted activity and selectivity, both alone or in combination. Moreover, the activity of these compositions has been found to rapidly decrease after the passage of relatively short periods of usage.

An object of this invention is to provide new compositions having a uniquely fine dispersion or distribution of catalytically-active metals.

A further object of this invention is to provide improved compositions which will contain finely-distributed active metals on supports and will overcome the difficulties attendant with the prior art catalysts.

Other objects and advantages of our invention will become apparent from the following description and appended claims.

According to our invention, a composition comprises a decationized amorphous aluminosilicate carrier having a $SiO_2/Al_2O_3$ ratio of greater than about 3.0, and having an active metallic element dispersed thereon, the dispersion of said element being such that the atomic characteristics of the element are dominant in the composition.

The general characteristics of the synthetic and naturally occurring amorphous base-exchange aluminosilicates have been adequately described in the chemical art. These base-exchange aluminosilicates are also referred to as zeolites in the chemical art.

We have found that negatively charged alumina tetrahedra can be maintained in the structure upon decationization by the processes of this invention. Effects of the interaction of the unpaired electrons of said negatively charged tetrahedra and the active metal atoms result in an active and thermally stable extremely fine dispersion of said active metal throughout the support.

"Decationization" relates to that unique condition whereby a substantial amount, i.e., at least about 10 percent of the aluminum atoms of the aluminosilicate structure are not associated with any cations.

The decationization of the novel compositions of this invention may be accomplished by ion-exchanging the alkali metal cations of the base-exchange aluminosilicate with ammonium ions or other, easily decomposable cations such as methyl or other substituted quaternary ammonium ions and then decomposing these ions at an elevated temperature.

The decationization process is more fully disclosed in copending application Serial No. 862,764, in the name of J. A. Rabo, P. E. Pickert and J. E. Boyle, filed concurrently herewith, and the description thereof is incorporated herein by reference.

While decationization of as low as 10 percent may be employed in the practice of this invention, it is preferred that the degree of decationization be at least 40 percent, it being understood that higher degrees of decationization are usually more desirable, i.e., a degree of decationization of about 80 or 90 percent will be more effective than a lower degree of decationization.

In decationizing amorphous base-exchange aluminosilicates the cation-exchange solutions should be more dilute than those used for the crystalline zeolites. Moreover, a slow heat-up (about 3 to 10° C./minute) of the aluminosilicate carrier to remove the decomposable cation should be employed.

Since some degree of structural integrity is essential, if some active alumina sites are to be retained in the carrier, it has been found necessary for the practice of this invention to employ an aluminosilicate having a silica to alumino ratio of greater than about 3.0. A silica to alumina ratio of less than about 3.0 will result in the collapse of the aluminosilicate carrier. In this regard, a preferred amorphous material for the practice of this invention has a $SiO_2/Al_2O_3$ ratio of about 5. However, it is to be understood that any amorphous aluminosilicate having an $SiO_2/Al_2O_3$ ratio of greater than about 3.0 can be effectively employed.

The supports of this invention can also be mixtures of the aforesaid aluminosilicate groups. In addition materials other than the aforesaid aluminosilicates can be employed for the purpose of introducing diluents or for obtaining special effects such as the provision of more than one type of catalytically active sites. A special effect of this type is exemplified by the preparation of an active catalyst for hydrocarbon conversion by the introduction of a halogen-acid along with the metal atoms. However, the metal atoms provide one type of an active site while the halogen-acid provides another. Diluents may also be introdued to enhance the physical properties of the compositions of this invention, if desired. Common diluents that can be used for this purpose are clays, silica, alumina, and the like.

The active metallic elements that may be employed in the process of this invention consist of those elements whose atoms have unpaired electrons and those elements whose atoms exhibit irregular paired electron behavior. The phrase "irregular paired electron behavior" denotes that condition where the element possesses an electron paramagnetic moment even though no unpaired electrons are present in the crystalline metal form. For example, an element having an even number of electrons may possess an odd number of electrons in certain orbitals. The phrase "paramagnetic moment," may be explained in the following manner:

When a certain charge distribution rotates about an axis, a magnetic dipole moment results. Thus, as a consequence of the angular momentum, or spin, each electron of the metallic atom bears a magnetic dipole moment. The magnetic dipole moment for an electron, therefore, is expressed as its "paramagnetic" moment. However, the effects of one electron may be balanced by another electron having an opposite spin. This is what happens in the case of paired electrons. In the practice of this invention, therefore, we prefer to employ those metallic atoms which do not exhibit paired electron behavior. The observed total "paramagnetic" moment of an atom is due to the aforesaid unpaired electrons or irregularities in those electron shells containing paired electrons.

We have found that because of the nature of the metallic bond, whereby metal atoms are bonded with their neighbors in the metal crystal, the observed electron paramagnetic moment is substantially less for a bulk metal agglomeration than for the individual atoms.

Among those metallic elements which may be employed in the practice of this invention are the metals of group VIII, group IB, group IIB, and group VIB of the periodic table and other suitable, easily reducible metals having the aforesaid paramagnetic characteristics. For the purpose of this invention, the periodic table herein referred to is found on pages 392–393 of the Handbook of Chemistry and Physics, published by Chemical Rubber Publishing Company, 36th edition.

For the purposes of this invention, we prefer to employ the metals of group VIII, and in particular, platinum and palladium.

For the practice of this invention it is essential that a very fine dispersion of the metallic elements be effected in the catalytic carrier, i.e., a dispersion of such fine magnitude that can be characterized by changes in the electron paramagnetic moment, low-angle X-ray scattering, and the like. For example, as a consequence of this dispersion, the aforedescribed paramagnetic moment of the dispersed element will be substantially greater than the electron paramagnetic moment of the same metal in agglomerated, bulk form.

The atomic dispersion of the metallic element results not only in different magnetic properties, but also in a change in the chemical properties. Hence, the electrons previously used for metal bonding are now available for chemical activity. Moreover, unpaired electrons present in the element further enhance the chemical activity. It has been found that in order to prevent the agglomeration of the incorporated active metal, the minimum distance between two adjacent metal atoms in the support must be at least twice the distance between two adjacent exchangeable cation-exchange sites of the support, or, in any event, at least 10 A. for a substantial amount of the metal atoms introduced. The microstructure of the catalytic carrier must be dimensionally stable throughout and subsequent to the activation of the catalyst and the reduction of the introduced metal cations. Any substantial structural change in the support should be effected before the introduction of the metal atoms in the support material.

The novel compositions of this invention are prepared through the use of ion-exchange techniques. However, because of the fine dispersion required of our compositions, the ion exchange is carried out with a very dilute, ionized solution of the catalytically active metal salt, the cation comprising the active metal, the solution having at least 200 parts by weight of solvent to one part by weight of the soluble, ionic salt of the active metal. This solution and the decomposable cation-exchanged support are then mixed in a slurry comprising at least two parts by weight of the solution to one part by weight of the support.

The solution of the active metal salt is then kept in intimate contact with the support for a period of time sufficient to effect a nearly statistical distribution of the active metal or metal-complex form throughout the exchangeable cation-exchange sites of the support. In loading the active metal on the support by such a method it is possible to obtain the highest degree of dispersion.

After the catalytically active metal is introduced in the support by the above described process, the metal is bonded to the insoluble support and cannot be removed by washing. Before or during the time the loaded material is activated for catalytic purposes, the material may be subjected to conditions which will destroy the existing ionic-type bond and convert the metal or metal-complex cation to elemental form, while maintaining an essentially atomic dispersion. In a very general sense, this procedure will produce metal atoms adsorbed on a solid phase. The metal atom will therefore no longer be bonded to the structure by a strong ionic bond and is therefore prone to migrate and form metallic aggregates or crystallites of the elements. It has been found that the conditions and procedures used in this stage of the catalyst synthesis are very critical. However, the deleterious conditions may be controlled by effecting the decomposition of the non-metallic cations and the deposition of the catalytically active metal by heating at temperature above 300° C. and preferably above 400° C. This operation may be carried out in vacuum, air, oxygen, or a reducing atmosphere, such as provided by hydrogen, methane, and carbon monoxide.

A preferred deposition of the metal and the removal of non-metallic cation is illustrated by the following steps:

(1) The ion-exchanged support is heated from room temperature to about 200° C. in about one hour (preactivated), (2) The support is then maintained at about 200° C. for about one hour, (3) The support is then heated from about 200° C. to about 500° C. in about two hours, and (4) The support is then maintained at 500° C. for about two hours. However, additional heating time may be employed, if desired.

While any suitable degree of loading of the active metal may be employed, a preferred range is between about .05 percent and about 5.0 percent by weight. A still more preferred range is between 0.2 and about 0.6 weight percent loading. These weight percent loadings are based on platinum. To adapt these aforedescribed ranges for other metals, the values must be multiplied by the ratio of the atomic weight of the other metal to platinum. For example, to determine the desired range for Cu loading, the multiplication factor is 63.54/195.23.

The following examples will illustrate the practice of this invention:

EXAMPLE I

Preparation of Cu Loaded Catalyst

To 197 grams of a previously ammonium-exchanged synthetic, base-exchange amorphous aluminosilicate having synthetic amorphous aluminosilicate having a $SiO_2/Al_2O_3$ of 5.3, slurried with 400 ml. of water, 400 ml. of 0.04 N $CuSO_4$ solution are added through a dropping funnel. The slurry is vigorously stirred for two hours. The slurry is then filtered with suction. The filtered solids are then washed with distilled water and again filtered by suction. This procedure is repeated until a negative test is obtained for $SO_4^=$ in the wash water with $BaCl_2$ reagent. The filtered material is slowly dried and brought to a temperature of 207° C. The material is then held at this temperature for 69 minutes. After this time the material is slowly heated to 500° C. and held at this temperature for 150 minutes. All of the heating is carried out in hydrogen.

EXAMPLE II

Preparation of Pd Loaded Catalyst

In a three liter flask 400 grams of a previously ammonium-exchanged synthetic, amorphous base-exchange aluminosilicate having a $SiO_2/Al_2O_3$ ratio of 5.3 and 800 ml. of water are slurried with 800 ml. of 0.025 N $Pd(NH_3)_4Cl_2$ solution. After the addition of the solution the slurry is stirred for two hours. The slurry is then filtered with suction and washed thoroughly with distilled water. After the washing, the filtered material is dried and slowly heated to 200° C. in about one hour. The material is then held at this temperature for 70 minutes. Then the material is slowly heated to 500° C. and held at this temperature for 2¼ hours. The heating is carried out in vacuum.

TABLE I.—RESULTS OF MICRO UNIT TESTS TO DETERMINE EFFECTS OF ACTIVATION

| Material | Fixing Atmosphere | $SiO_2$ to $Al_2O_3$ Ratio | Mole-percent Aromatics at 450° C. from n-heptane | Mole percent n-$C_7$ |
|---|---|---|---|---|
| Pt on synthetic amorphous aluminosilicate. | Air at 225° C. | 5.3 | 12 | 50 |
| Do | No preactivation. | 5.3 | 6 | 72 |

The results of Table I show that the preactivation step improved catalytic activity by about 100 percent.

The aforedescribed amorphous compositions containing such materials as copper, mercury, silver, gold and molybdenum, have utility for chemisorption processes. In addition copper and silver containing compositions of this invention have the additional utility of being oxidizing catalysts.

The group VIII-containing compositions of this invention have utility in hydrocarbon converting and in particular, isomerization processes. This is particularly true of the palladium and platinum-containing catalysts. In this regard, moreover, the palladium catalysts of this invention can be successfully employed in the conversion of hydrocarbon streams having a sulfur content of up to about 100 parts per million without a substantial decrease in catalytic activity. This constitutes a considerable improvement over heretofore employed palladium catalysts. In addition to the above described advantages, the palladium (and also platinum) catalysts of this invention can withstand occasional operation with hydrocarbon streams exceeding 100 p.p.m. sulfur content. The ensuing, temporarily poisoned, palladium catalyst is capable of self-regeneration while used with a hydrocarbon stream having a sulfur content within the specified tolerances.

As an additional advantage, in many processing operations concerned with desulfurization of the hydrocarbon streams, the severity of the treatment may be reduced or the desulfurization operation may be altogether eliminated if the herein disclosed palladium catalysts are employed, thus further decreasing the over-all operating costs.

The palladium catalysts of this invention are useful in reforming operations, in which a saturated gasoline, such as straight-run gasoline, natural gasoline, etc., is reformed to produce a gasoline having improved anti-knock properties. The saturated gasoline generally comprises a mixture of naphthenic and paraffinic hydrocarbons. The reforming operation effects the dehydrogenation of the naphthenic hydrocarbons to aromatics, the cyclization of the paraffinic hydrocarbons to aromatics, and a controlled type of cracking which is selective both in quality and quantity. In addition, other reactions such as isomerization, hydrogen transfer, etc., may occur. The controlled or selective cracking is desirable because it further increases the octane number of the reformed gasoline, produces a gasoline of higher volatility and converts higher boiling fractions to lower boiling fractions within the range of gasoline. However, this cracking must be controlled, because excessive cracking produces excessive amounts of normally gaseous products and also causes excessive carbonaceous deposits on the catalyst.

As another embodiment of this invention the palladium catalyst may be augmented by the introduction of platinum by any of the usual, heretofore employed manufacturing methods. The finely dispersed palladium-platinum catalyst, the palladium being dispersed as specified in this invention, will give catalytic performance equivalent to that of a platinum catalyst used on identical carriers with the advantage that this palladium-platinum catalyst will have a lower cost. The sulfur-poisoning resistance of said palladium-platinum catalyst is similar to that of an all-platinum or palladium catalyst.

An alternate procedure for the preparation of the finely dispersed palladium or platinum catalysts of this invention is to first ion-exchange the carrier with a nonmetallic cation such as ammonium, hydrogen, etc. Part of this exchanged cation is further displaced by a complex palladium salt or a palladium salt in a dilute aqueous solution. This introduces the predetermined amount of palladium in the final product as specified in this invention. The criticalities of the drying, activation, and subsequent reduction steps are the same as described previously.

Further embodiments of the present invention are shown in hydrocarbon conversion processes such as hydroconversion, hydrodesulfurization, etc. Typical hydroconversion reactions are:

(A) Naphthene dehydrogenating—

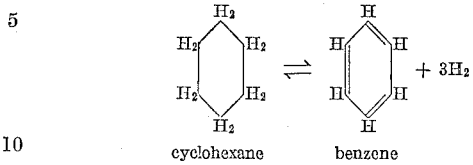

cyclohexane    benzene (B) Naphthene dehydroisomerization—

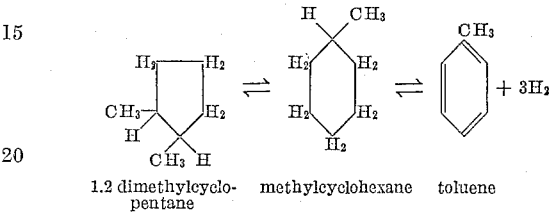

1.2 dimethylcyclopentane    methylcyclohexane    toluene (C) Paraffin dehydrocyclization—

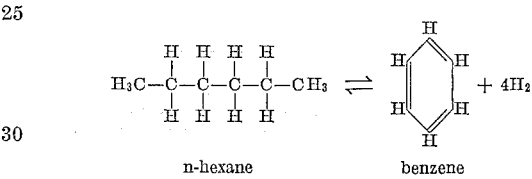

n-hexane    benzene (D) Paraffin hydrocracking—

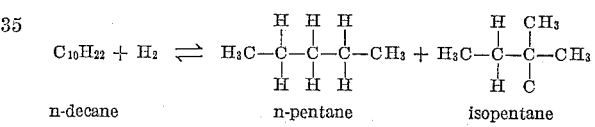

n-decane    n-pentane    isopentane (E) Olefin hydrogenation—

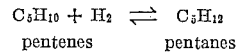

pentenes    pentanes (F) Paraffin isomerization—

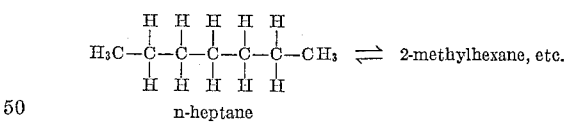

n-heptane

The catalysts of the present invention can also be employed for hydrodesulfurization. This reaction is exemplified by:

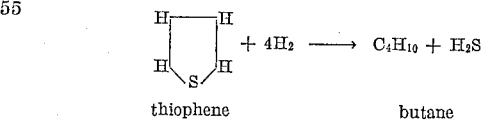

thiophene    butane

The hydroconversion of straight-run and cracked naphthas boiling in the range of 150° F. to 400° F. to obtain motor fuels, and for the hydroconversion of straight-run naphthas to obtain aromatics and aviation gas requires the following reactive conditions: The temperature employed should be within the range of about 850° F. to about 980° F., the pressure should be about 200 pounds per square inch gauge, and the weight hourly space velocity should be within the range of about 1 to about 4.

For the hydroconversion of naphthenes to aromatics, aromatization of paraffins, isomerization of paraffins, hydrocracking of high-boiling paraffins, the temperature employed should be within the range of about 850° F. to about 1000° F., the pressure should be within the range of about 300 pounds per square inch gauge to about 700 pounds per square inch gauge, and the weight hourly space velocity should be within the range of about 1 to about 5.

For the hydroconversion of low octane naphthas to high octane gasoline blending stocks having clear octane ratings up to 104 the temperature employed should be within the range of about 900° F. to about 970° F., the pressure should be within the range of about 200 pounds per square inch gauge to about 300 pounds per square inch gauge, and the weight hourly space velocity should be within the range of from about 1 to 5. Usually the hydrogen recycle rate is adjusted to the particular characteristics of the charge employed and the product desired.

For the hydroconversion of paraffinic stocks by destructive hydrogenation the temperature employed should be within the range of about atmospheric to about 500° F., the pressure should be within the range of about 100 pounds per square inch to about 3000 pounds per square inch, and the weight hourly space velocity should be within the range of about 0.5 to about 5.

The weight hourly space velocity (WHSV) is defined as the weight per hour of the feed per weight of catalyst in the reaction zone.

In some of the embodiments of these processes sufficient hydrogen is produced in the hydroconversion reaction to furnish the hydrogen required in the process, hence it may be unnecessary to either introduce the hydrogen from an extraneous source or to recycle hydrogen within the process. The preferred embodiment, however, comprises the introduction of hydrogen from an extraneous source, generally at the beginning of the operation and the recycling of hydrogen within the process in order to be assured of a sufficient supply of hydrogen in the reaction zone.

The processes employing the compositions of the present invention may be effected in any suitable equipment. A particularly suitable process comprises the well known fixed bed system in which the catalyst is disposed in a reaction zone and the hydrocarbons to be converted are passed therethrough in either upward or downward flow. The products are fractionated to separate hydrogen and to recover the desired products. This hydrogen may then be recycled for further use. Other suitable units with which the process may be effected include the fluidized-type catalyst beds in which the hydrocarbons and the catalysts are maintained in a state of turbulence under hindered settling conditions in the reaction zone, the compact-moving bed type in which the catalyst and hydrocarbons are passed either concurrently or countercurrently to each other, and the suspensoid type of operation in which the catalyst is carried into a reaction zone and is slurried with the hydrocarbon stream.

In addition to the palladium and platinum-loaded catalytic supports which constitute the preferred group of catalysts for the purposes of hydroconversion, iron, cobalt, nickel, ruthenium, rhodium, osmium, and iridium can be successfully used in the catalytic compositions of the present invention for hydrocarbon hydroconversion. The sulfur resistance exhibited by the palladium and platinum catalyst is also present in the catalysts comprising, alone and in combination, the elements of the above-listed group.

Table II illustrates the behavior of Pt-loaded, decationized amorphous zeolites in converting n-hexane feed.

TABLE II

| Material | Reaction Temp., °C. | Products (Mole Percent) | | | |
|---|---|---|---|---|---|
| | | $C_1$-$C_4$ | Total $C_6$ | 2,2-DMB in $C_6$* | n-$C_6$ in $C_6$ |
| Amorphous synthetic base-exchange aluminosilicate ($SiO_2/Al_2O_3$=5.3). | 400 | 2 | 94 | 5 | 42 |
| | 450 | 22 | 63 | 9 | 30 |

*2,2-DMB—2,2-dimethylbutane.

Table III further illustrates the effectiveness of the decationization treatment in providing a good isomerization catalyst.

TABLE III

| Type of Alumino-Silicate | $SiO_2/Al_2O_3$ | Distribution | Isomerization of n-Hexane | | | | Reaction Temp., °C. |
|---|---|---|---|---|---|---|---|
| | | | Pt content, wt.-percent | Yield, Volpercent $C_6$ | Yield, Molepercent iso-$C_6$ | Yield, Mole-percent 2,2-DMB | |
| Amorphous synthetic base-exchange aluminosilicate. | 5.3 | 100 Na | .5 | 96.7 | 1.4 | 0.5 | 450 |
| Do | 5.3 | 60 Na—40 Ca | .5 | 98+ | 5.0 | 0.2 | 400 |
| Do | 5.3 | 5 Na—95 decationized. | .5 | 96.9 | 61.2 | 6.6 | 400 |
| | | | | 96.9 | 63.7 | 10.0 | 425 |

The process conditions for the data in Table III were:

WHSV _____ 2.0 hrs.$^{-1}$.
Pressure _____ 450 p.s.i.g.
$H_2$:hydrocarbon _____ Mole ratio 5:1.

What is claimed is:

1. A composition, which comprises an amorphous base-exchange aluminosilicate catalytic support, having a $SiO_2/Al_2O_3$ ratio greater than 3, having less than 90 percent of its aluminum atoms electrically balanced with cations, and having a catalytically active metallic element dispersed thereon, the dispersion of said element being such that the minimum distance between two adjacent elemental metal atoms is at least twice the distance between two adjacent exchangeable cation sites of the support so that the atomic characteristics of the element are dominant in the composition.

2. A composition as claimed in claim 1, in which the amorphous support has less than 60 percent of its aluminum atoms associated with cations.

3. A composition as claimed in claim 1, in which the amorphous support is a base-exchange aluminosilicate having a $SiO_2/Al_2O_3$ ratio of about 5.

4. A composition which comprises an amorphous base-exchange aluminosilicate support, having a $SiO_2/Al_2O_3$ ratio greater than 3, having less than 90 percent of its aluminum atoms electrically balanced with cations and having an active metallic element dispersed thereon, said element being a member selected from the group consisting of gold, silver, mercury, copper, molybdenum, and the metals of group III of the periodic table, said element being dispersed on said support such that the minimum distance between two adjacent elemental metal atoms is at least twice the distance between two adjacent exchangeable cation sites of the support so that the atomic characteristics of the element are dominant in the composition.

5. A composition as claimed in claim 1, in which the active metallic element is palladium.

6. A composition as claimed in claim 1, in which the active metallic element is platinum.

7. A process for the conversion of hydrocarbons which comprises contacting said hydrocarbons with an amorphous aluminosilicate having a $SiO_2/Al_2O_3$ ratio greater than about 3, having less than 90 percent of its aluminum atoms electrically balanced with cations, and having a metal of group VIII of the periodic table present on the support in amount of at least about 0.05 weight percent; under hydrocarbon converting conditions, said metal being dispersed such that the minimum distance between two adjacent metal atoms is at least twice the distance between two adjacent exchangeable cation sites of the support so that the atomic characteristics of the metal are dominant.

8. A process for the conversion of hydrocarbons which comprises contacting said hydrocarbons with an amorphous aluminosilicate having a $SiO_2/Al_2O_3$ ratio greater than about 3, having less than about 60 percent of its aluminum atoms electrically balanced with cations, and having a metal of group VIII of the periodic table present on the support in amount of at least about 0.05 weight percent; under hydrocarbon converting conditions, said metal being dispersed such that the minimum distance between two adjacent metal atoms is at least 10 angstroms for a substantial amount of said metal atoms so that the atomic characteristics of the metal are dominant.

References Cited in the file of this patent
UNITED STATES PATENTS

| | | |
|---|---|---|
| 1,840,450 | Jaeger et al. | Jan. 12, 1932 |
| 2,469,733 | Kearby | May 10, 1949 |
| 2,484,258 | Webb et al. | Oct. 11, 1949 |
| 2,744,056 | Offutt et al. | May 1, 1956 |
| 2,971,903 | Kimberlin et al. | Feb. 14, 1961 |
| 2,971,904 | Gladrow et al. | Feb. 14, 1961 |
| 3,028,434 | Weisz | Apr. 3, 1962 |
| 3,030,181 | Milton | Apr. 17, 1962 |

UNITED STATES PATENT OFFICE
CERTIFICATE OF CORRECTION

Patent No. 3,114,695                      December 17, 1963

Jule A. Rabo et al.

It is hereby certified that error appears in the above numbered patent requiring correction and that the said Letters Patent should read as corrected below.

Column 8, line 63, for "III" read -- VIII --.

Signed and sealed this 9th day of June 1964.

(SEAL)
Attest:
ERNEST W. SWIDER

Attesting Officer

EDWARD J. BRENNER

Commissioner of Patents